Feb. 14, 1956     H. N. WEBSTER     2,734,713
VALVES
Filed March 12, 1953
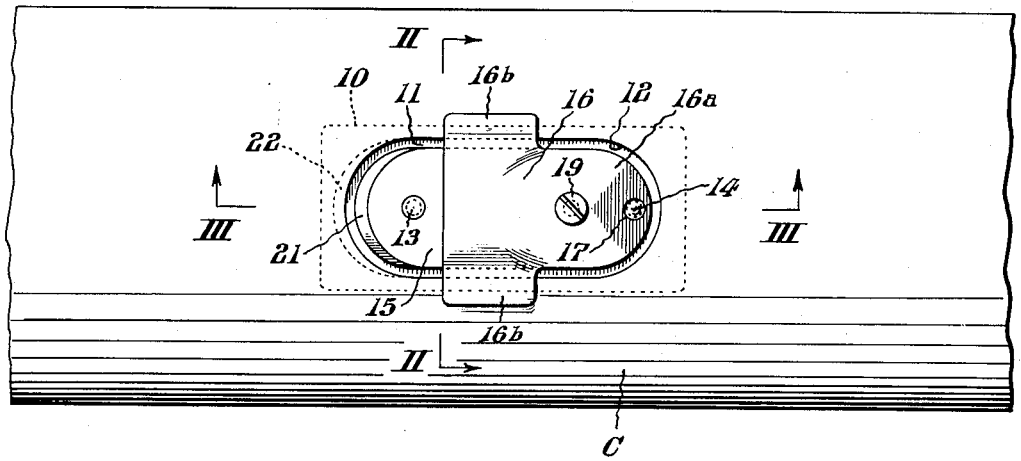
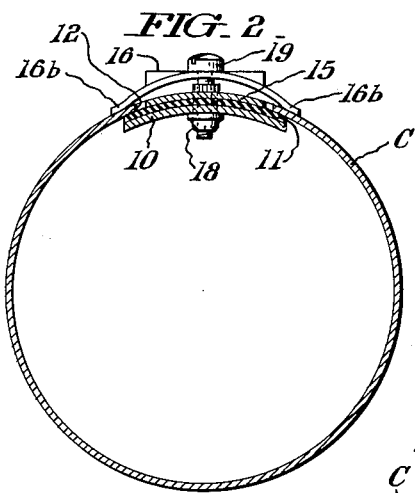
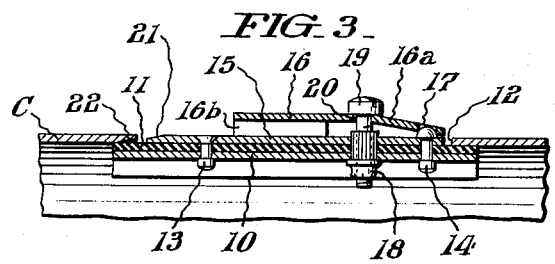
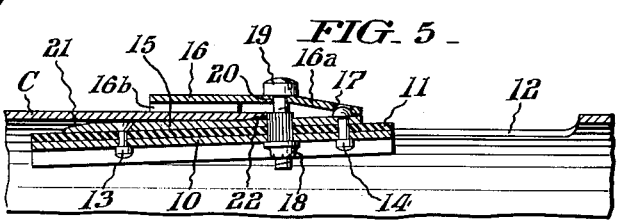
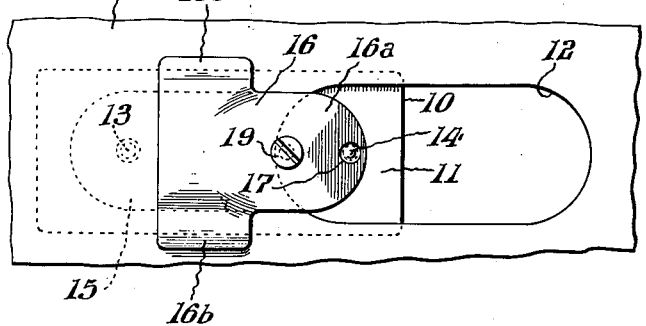
INVENTOR.
*Henry N. Webster,*
BY *Paul & Paul*
ATTORNEYS.

United States Patent Office 2,734,713
Patented Feb. 14, 1956

2,734,713

VALVES

Henry N. Webster, Sebring, Fla., assignor to The Webster Corporation, Sebring, Fla., a corporation of Florida Application March 12, 1953, Serial No. 341,868

7 Claims. (Cl. 251—145)

This invention relates to valves. More specifically, it is concerned with valves intended for use with conduits of irrigation systems to control discharge of water into down hill trenches or ditches in agricultural sections where the soil is apt to bake hard when exposed dripping wet to hot sun, and where water is scarce and the source of supply is below the high land in the fields.

The chief aim of my invention is to provide a valve for the above mentioned purpose which is of simple and inexpensive construction; which is easily opened and closed; and which can be readily installed in previously laid conduiting without necessitating employment of skilled help or the use of any special or complicated tools.

Other objects and attendant advantages will appear from the following detailed description of the attached drawings, wherein:

Fig. 1 is a fragmentary view of a conduit fitted with my improved valve.

Fig. 2 is a cross section taken as indicated by the angled arrows II—II in Fig. 1.

Fig. 3 is a fragmentary view in longitudinal section taken as indicated by the angled arrows III—III in Fig. 1.

Figs. 4 and 5 are views corresponding to Figs. 1 and 3 but showing the valve in open position.

As herein exemplified, my improved valve comprises an elongate closure element 10 which, in practice, is preferably fashioned from non-corrosive sheet metal such as aluminum, the same being provided with a facing 11 of rubber or the like to seal against the edge margin of a longitudinally-arranged round-ended elongate port 12 of smaller area in the wall of the conduit C from the inside of the latter. Overlaid upon the closure element, and secured thereto at opposite ends by rivets 13 and 14, is a backing plate 15 also preferably of non-corrosive sheet metal and which, although somewhat smaller in area than the port 12, is of the same general configuration and occupies said port when the valve is closed as shown in Figs. 1 and 3. From Fig. 2 it will be noted that closure element 10 and its backing plate 15 are both arcuate crosswise for conformity with the cross-sectional rounding of the conduit C. Surmounting backing plate 15 is a spring element 16 having a shank portion 16a which is apertured as at 17 to engage over the rounded top head of rivet 14, and a transverse arching portion medially of the length of the closure element whereof the ends 16b bear upon the outer surface of conduit C somewhat beyond the longitudinal edges of port 12. Threadedly engaged into a bushing 18 set into closure element 10 slightly forward of rivet 14 is a cap screw 19 whereof the shank passes through a clearance opening 20 in the shank portion 16a of spring element 16. Screw 19 thus serves in conjunction with rivet 14 not only as a means to hold spring element 16 assembled in proper relation to closure element 10, but also as a means for regulating the pressure of said spring element.

Normally, with the valve closed as in Figs. 1 and 3, the facing 11 of closure 10 is maintained in fluid tight pressure against the inside of conduit to seal the port 12 by the upward pull of spring element 16. To open the valve, the forward end of closure element 10 is pressed inward of conduit against the resistance of spring element 16 and so held temporarily by the pressure of the thumb of one hand upon the corresponding end of backing plate 15.

With this accomplished, the complete valve assemblage is shifted forward by the thumb of the other hand to the position of Figs. 4 and 5 to expose port 12 and permit flow through it, stud 18 acting as a stop against the forward edge of said port. To close the valve, the assemblage is simply slid back into place incident to which backing element 15 will snap into position within the port 12 under the influence of spring element 16 to hold the valve against accidental displacement in closed position as will be readily understood from Fig. 3. It is to be noted from Figs. 1, 3 and 5 that the backing plate 15 is beveled off at its frontal end as indicated at 21, and that the forward edge portion of port 12 is beveled off as at 22 inwardly of the conduit to facilitate initiation of valve opening in the manner above explained.

From the foregoing it will be seen that any improved valve is simple in construction and composed of few parts which lend themselves to expeditious and economic fabrication. It will also be evident that the valve can be readily installed in the conduit even after the latter has been laid in the field, the only real labor required being to cut the port hole through the conduit wall which, obviously, can be readily and quickly done by using an ordinary drill and a hack saw. After the hole is cut, the closure element 10 is inserted through the hole and brought up against the inner side of the conduit wall, whereupon the spring retaining element 16 is engaged with the rounded head of rivet 14 and secured by the regulating screw 19 in a manner readily understood from the drawings. Still another attribute of my improved valve is that it is close fitting enough and strong enough to prevent, when closed, leakage even from conduiting or piping used in pressure irrigation sprinklers and the like.

Having thus described my invention, I claim:

1. A valve of the character described comprising a slidable elongate closure element adapted, when in closed position, to lap the edge margin of a similarly configured but smaller longitudinally extending port in the wall of a cylindric conduit from the inside; and a retaining element in the form of an overreaching spring retaining tongue connected at one end to the rear end of the closure element and having at its distal end a transverse upwardly arched portion whereof the curvature is less than the radius curvature of the conduit with the extremities of said portion bearing upon the outer face of the conduit adjacent the long side edges of the port.

2. A valve according to claim 1, further including a head regulating screw whereof the shank passes through a clearance hole in the spring tongue and threadedly engages into the closure element.

3. A valve according to claim 1, wherein the closure element has a facing of rubber or the like to seal against the inside of the conduit around the port.

4. A valve of the character described comprising a slidable elongate closure element adapted, when in closed position, to lap the edge margin of a similarly configured but smaller longitudinally-extending port in the wall of a cylindric conduit from the inside of the latter; a backing plate affixed to the closure element, said plate corresponding substantially in size and configuration to the port and occupying said port when the valve is closed; and a spring retaining element connected to the closure element adjacent one end thereof and having a curved transverse arching portion whereof the radius of curvature is less than that of the pipe, with its ends located medially of the length of the closure element bearing against the outer face of the conduit adjacent the long side edges of the port.

5. A valve according to claim 4, wherein the spring retaining element is connected to the closure element by a headed regulating screw whereof the shank passes through a clearance opening in the retaining component and threadedly engages into the closure element.

6. A valve according to claim 4, wherein the backing plate is secured adjacent opposite ends to the closure element by rivets; wherein the spring retaining element has a shank portion with an aperture adjacent the end thereof engaged over a head of one of the rivets; and wherein the spring retaining element is connected to the closure element by a headed regulating screw whereof the shank passes through a clearance opening in the shank portion of the retaining element adjacent the aforesaid aperture and threadedly engages into the closure element.

7. A valve according to claim 4, wherein a facing of rubber or the like is interposed between the closure element and its backing plate to seal around the margin of the port at the inside of the conduit.

References Cited in the file of this patent

UNITED STATES PATENTS

| | | |
|---|---|---|
| 1,090,264 | Adams | Mar. 17, 1914 |
| 1,195,102 | Schmidt | Aug. 15, 1916 |
| 2,039,952 | Donnelly | May 5, 1936 |
| 2,093,574 | Poitras | Sept. 21, 1937 |
| 2,129,758 | Frey | Sept. 13, 1938 |
| 2,647,539 | Stearns | Aug. 4, 1953 |
| 2,649,776 | Konchan | Aug. 25, 1953 |
| 2,684,827 | Hohnstein | July 27, 1954 |

FOREIGN PATENTS

| | | |
|---|---|---|
| 337,005 | Germany | 1918 |
| 449,338 | Great Britain | 1936 |